United States Patent
Li et al.

(10) Patent No.: US 8,015,515 B2
(45) Date of Patent: Sep. 6, 2011

(54) DISPLAY DESIGNING SYSTEM AND METHOD FOR DESIGNING A DISPLAY

(75) Inventors: I-Yin Li, Taipei (TW); Jean-Fu Kiang, Taipei (TW)

(73) Assignee: National Taiwan University (TW)

( * ) Notice: Subject to any disclaimer, the term of this patent is extended or adjusted under 35 U.S.C. 154(b) by 554 days.

(21) Appl. No.: 12/167,521

(22) Filed: Jul. 3, 2008

(65) Prior Publication Data
US 2010/0004904 A1   Jan. 7, 2010

(51) Int. Cl.
*G06F 17/50* (2006.01)
(52) U.S. Cl. ........... 716/55; 716/104; 716/113; 716/132
(58) Field of Classification Search ................ 716/55, 716/104, 113, 132
See application file for complete search history.

(56) References Cited

U.S. PATENT DOCUMENTS 6,151,682 A * 11/2000 van der Wal et al. ......... 713/401
* cited by examiner

*Primary Examiner* — Thuan Do
(74) *Attorney, Agent, or Firm* — Schmeiser, Olsen & Watts, LLP

(57) ABSTRACT

A display designing system and a method thereof. The display designing system includes a variety of operation modules and an integration module. After receiving initial parameters and selecting operation type parameters, the operation modules generate operation results and transfer the operation results to the integration module. The integration module integrates the operation results and generates a correspondence relation, such as an operation window, a compare-table and an equation. The integration module then transfers the operation results and the correspondence relation to the output module. The output module displays effect variations of a variety of designs corresponding to the initial parameters. Therefore, the method can provide a user with an easy way to obtain ideal design parameters for designing a display pixel circuit.

12 Claims, 3 Drawing Sheets

DISPLAY DESIGNING SYSTEM AND METHOD FOR DESIGNING A DISPLAY

BACKGROUND OF THE INVENTION

1. Field of the Invention

The present invention relates generally to a design system, and more particularly, to a liquid crystal display pixel circuit designing system and a method for designing a display.

2. Description of Related Art

A spatial color filter liquid crystal display (SCF-LCD) uses white backlight module such as cold cathode fluorescent lamp (CCFL) to provide a continuous wave light source with various wavelengths and enable the continuous wave light source to pass through pixels. In general, a pixel is composed of three sub-pixels, and a field effect transistor (FET) controls the electric field intensity of each sub-pixel, so as to determine the light intensity passing through the sub-pixel. The continuous wave light source, after passing through the sub-pixels, passes through and modulated by original light (red, green or blue) filters corresponding to the sub-pixels, to obtain original light needed by each of the sub-pixels. After entering human's eyes, the original light of the sub-pixels will be blended by a human visual imaging function into a color that the pixel desires to be seen.

A field-sequential liquid crystal display (FS-LCD) modifies the light source configuration of the backlight module directly. The FS-LCD replaces the white backlight module used in the SCF-LCD with three original light sources. Therefore, the FS-LCD no longer needs the color light filters, and no need to divide each pixel into sub-pixels. In operation, the color formation of the FS-LCD is performed by modulating light emitting clocks of three original light sources in the backlight module, and coordinating FETs of the pixels to control the electric field intensity of the pixels in accordance with the corresponding clocks, to determine the light intensity passing the pixels. In short, the FS-LCD determines the intensity of light passing the pixel by modulating the light-emitting clocks of the three original light sources of the backlight module and coordinating the FETs of the pixels to control the electric field intensity of the pixels in accordance with the corresponding clocks, so as to adjust the relative intensity of the three original light with the synchronously controlled liquid crystal pixel transmission. After the three original light enter human's eyes, the human's visual system performs an integration operation on light stimulus to mix the original light into a color that the pixel is desired to be seen and form a predetermined color.

In fact, the field-sequential image-forming technique has been introduced to the market for years, and there are some modern products, such as a digital light processing (DLP) projector, has adopted this technique and proven that this technique really works and performs well. However, if this technique is applied to an LCD, there are still some bottlenecks different from the DLP projector needs to be overcome.

In display technology field, a frame has to be displayed at a frequency higher than 60 Hz, to meet the lowest changing frequency required by the human visual system to successfully integrate a complete image. Because an SCF-LCD uses a white backlight module and three original color subpixel light filters for modulation, the SCF-LCD can provide three original color light sources at the same time, and operates at an operation frequency under the requirement of the lowest changing frequency (60 Hz). However, because an FS-LCD uses three original color backlight time-changing modules to replace a continuous wave light source, the transform frequency for the three original colors has to be three times as large as that of the continuous wave light source. In other words, the FS-LCD has to have the lowest changing frequency equal to 60 Hz multiplied by 3, i.e. 180 Hz, in order to meet the lowest changing frequency required by the human visual system to successfully integrate a complete image.

If the system synchronization of the FS-LCD is poor, the response frequency of the system will not meet the requirement of the lowest changing frequency of 180 Hz, thus resulting in a color breadup (CBU) effect, and affecting user's visual effects. From the above, it is obvious that how to increase the changing frequency so as to meet the requirement of the lowest changing frequency is becoming one of the most challenging issues on applying the field-sequential image-forming technique to an LCD.

To increase the changing frequency of an LCD system, not only the changing frequency of the backlight has to meet the requirement of the lowest changing frequency, the response of a display pixel circuit also has to meet the requirement of the lowest changing frequency. Tsukada proposed a theory to analyze LCD subpixel in "TFT/LCD Liquid-Crystal Displays Addressed by Thin-Film Transistors" $2^{nd}$ ed., Taylor & Francis, 2000, which the charging behavior of the pixel capacitance in a-Si TFT, dc voltage offset due to parasitic capacitance, and delay and distortion of the gate pulse. Y. H. Tai in 2006 proposed the concept of operation window based on charging, holding, coupling and delay ("Design and Operation of TFT-LCD Panels" WuNan, 2006).

In addition to meeting the requirement of the lowest changing frequency, considering the light transmission ratio of a pixel circuit is another important design concept in designing an LCD pixel circuit. In the operation of an LCD, the radiation light source passing through a pixel circuit is controlled by a voltage of the pixel circuit, if the pixel circuit has a large light transmission area, the pixel can attain high light transmission and have a better display effect, so as to reach a specific color and luminance standard with low power consumption and low cost. Y. Kaneko, A. Sasano, and T. Tsukada proposed an equivalent circuit used in designing a subpixel of an LCD (referring to "Analysis and design of a-Si TFT/LCD panels with a pixel model," IEEE Trans. Electron Dev., vol. 36, no. 12, pp. 2953-2958, December 1989), which is a newly developed pixel model based on which a variety of LCD design models are developed. Please refer to FIG. 1. According to the equivalent circuit, persons skilled in the art not only know a basic structure of a pixel circuit, but also learn that the pixel circuit has a large portion of area which allows no light to transmit.

In designing products, design requirements and design constraints have to be considered at the same time. For example, considering the design requirements and design constraints, such as charging/discharging behaviors, potential holding, capacitor coupling effect and signal delay, comprehensively, is one of the most important issues in designing a pixel circuit. However, no designing system has ever been proposed to consider the above design parameters of the display pixel circuit at the same time and to operate, compare and display effect variations of a variety of designs corresponding to design parameters and help a designer to select ideal design parameters for aiding in designing a display pixel circuit.

Therefore, how to provide a display designing system, which operates, compares and displays effect variations of a variety of designs corresponding to design parameters and helps a designer to select ideal design parameters for aiding in designing a display pixel circuit, is becoming one of the most urgent errands in the art.

SUMMARY OF THE INVENTION

In view of the above drawbacks of the prior art, an objective of the present invention is to provide a display designing system to operate, compare and display effect variations of a variety of designs corresponding to design parameters.

Another objective of the present invention is to provide a display designing system, which helps a designer to select ideal design parameters and aids in designing a display pixel circuit.

In order to attain the above and other objectives, the present invention provides a display designing system, which is applied to a data processing device having an input module for inputting initial parameters, selecting operation type parameters and selecting output form parameters and an output module for displaying output results. The displaying designing system includes a capacitor charging operation module for performing operations in accordance with a first operation rule after receiving the initial parameters input to the input module, to generating a first operation result about capacitor charging; a potential holding operation module for performing operations in accordance with a second operation rule after receiving the initial parameters input to the input module, to generate a second operation result about potential holding; a asymmetric kickback operation module for performing operations in accordance with a third operation rule after receiving the initial parameters input to the input module, to generate a third operation result about asymmetric kickback; a signal delaying operation module for performing operations in accordance with a fourth operation rule after receiving the initial parameters input to the input module, to generate a fourth operation result about signal delaying; and an integration module for receiving the first operation result from the capacitor charging operation module, the second operation result from the potential holding operation module, the third operation result from the asymmetric kickback operation module and the fourth operation result from the signal delaying operation module, and comparing the first operation result, the second operation result, the third operation result and the fourth operation result in accordance with the selected operation type parameters and the output form parameters, to generate a correspondence relation of the first operation result, the second operation result, the third operation result and the fourth operation result and transfer the first operation result, the second operation result, the third operation result, the fourth operation result and the correspondence relation to the output module.

The present invention further provides a display designing method, which is applied to a data processing device having an input module for inputting initial parameters, selecting operation type parameters and selecting output form parameters and an output module for displaying output results. The displaying designing method includes inputting the initial parameters, the operation type parameters and the output form parameters to the input module; having the input module to transfer the initial parameters to a capacitor charging operation module, a potential holding operation module, an asymmetric kickback operation module and a signal delaying operation module, and transfer the output form parameters and the operation types parameters to an integration module; performing operations on the initial parameters in accordance with operation rules of the capacitor charging operation module, the potential holding operation module, the asymmetric kickback operation module and the signal delaying operation module, to generate operation results corresponding to the operation modules, respectively, and transferring the operation results to the integration module; after the integration module receives the operation results, comparing the operation results in accordance with the selected operation type parameters and the output form parameters and generating a correspondence relation of the operation results, and transferring the operation results and the correspondence relation to the output module; and having the output module to display the operation results and the correspondence relation.

Compared with the prior art, the operation modules of the display designing system of the present invention, after the initial parameters are input and operation type parameters are selected, generate operation results and transfer the operation results to the integration module, which integrates the operation results and generates a correspondence relation, such as an operation window, a compare-table and an equation, and transfers the operation results and the correspondence relation to the output module. The output module displays effect variations of a variety of designs corresponding to the initial parameters. Therefore, the method can provide a user with an easy way to obtain ideal design parameters for designing a display pixel circuit.

DETAILED DESCRIPTION OF PREFERRED EMBODIMENTS

The following illustrative embodiments are provided to illustrate the disclosure of the present invention, these and other advantages and effects can be apparent to those skilled in the art after reading the disclosure of this specification.

Figure 1:
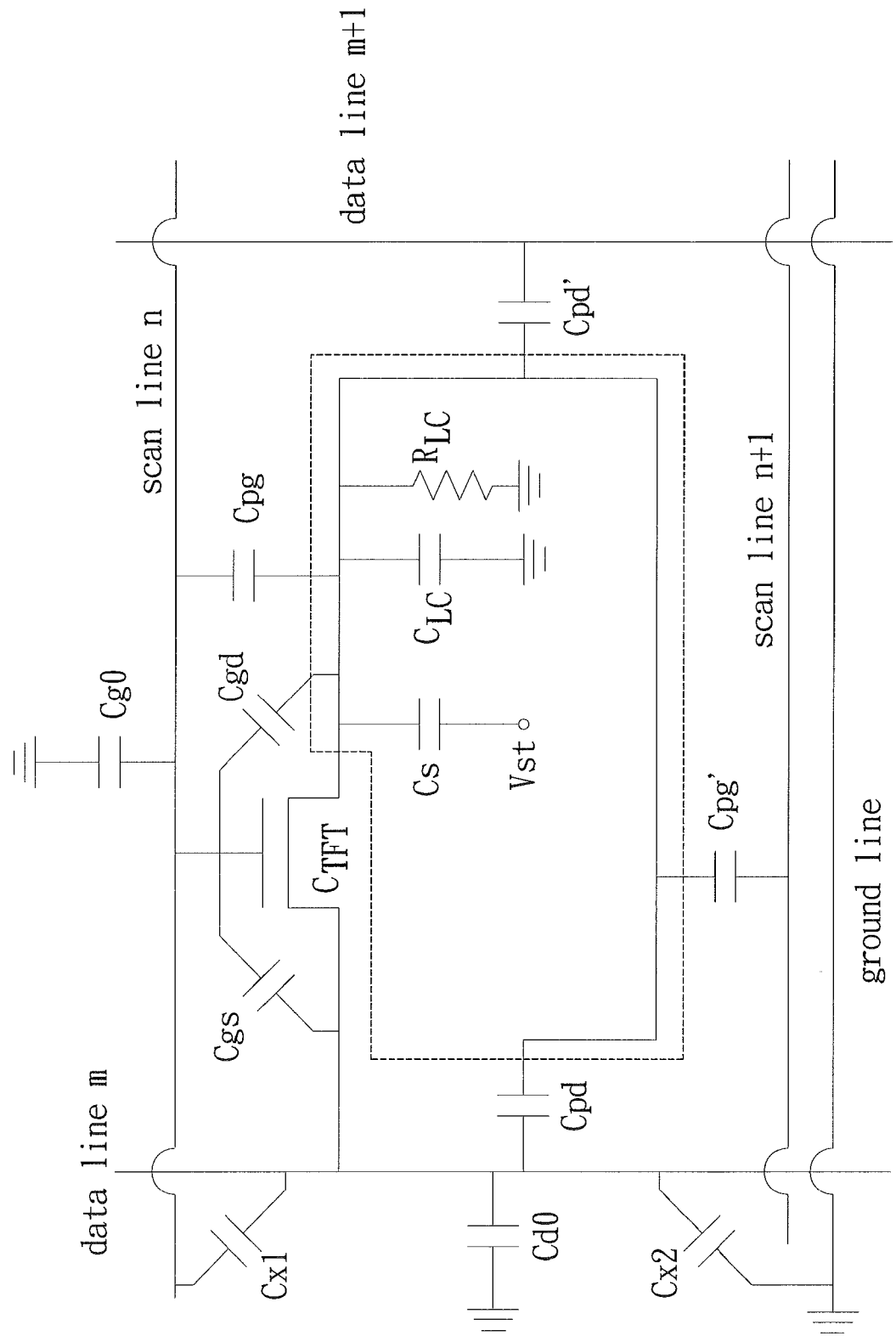
FIG. 1 is an equivalent circuit diagram of a liquid crystal display pixel.
Figure 2:
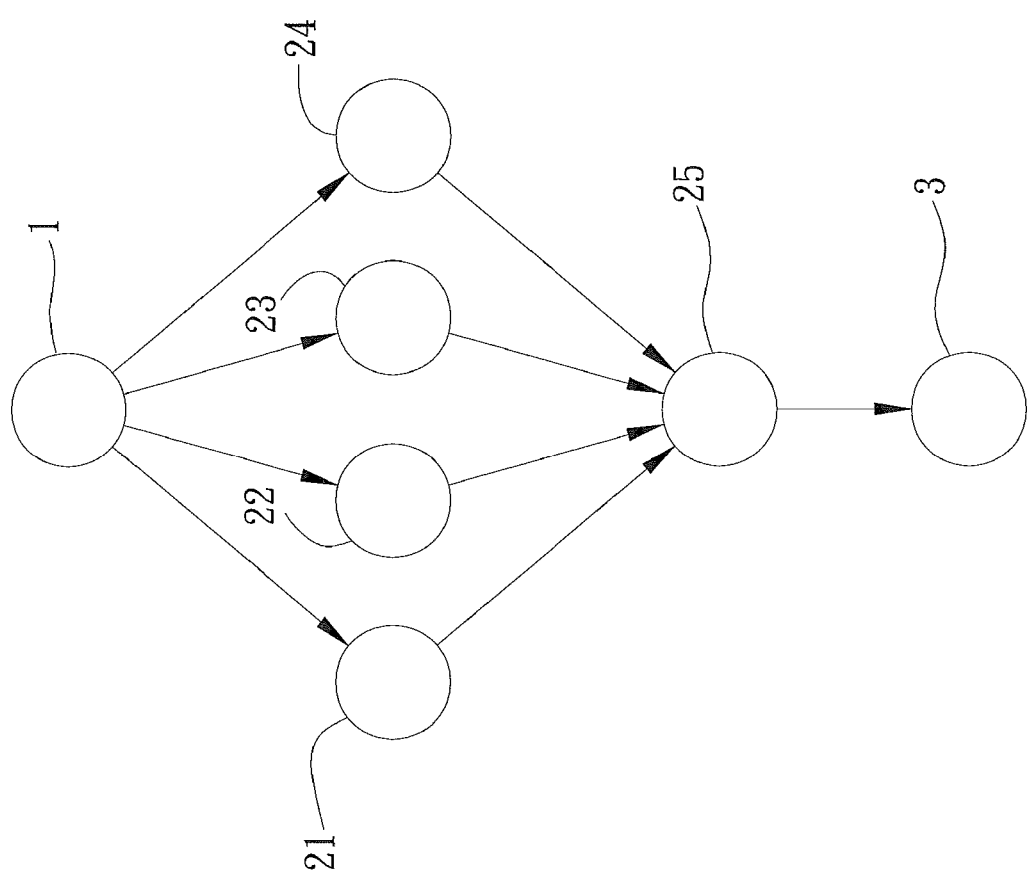
FIG. 2 is a functional block diagram of a display designing system of the present invention.

FIG. 2 is a functional block diagram of a display designing system of the present invention. The display designing system is applied to a data processing device having an input module 1 for inputting initial parameters, selecting operation type parameters and selecting output form parameters, and an output module for displaying output results. The display designing system comprises a capacitor charging operation module 21, a potential holding operation module 22, an asymmetric kickback (capacitor coupling) operation module 23, a signal delaying operation module 24 and an integration module 25.

The capacitor charging operation module 21, after receiving the initial parameters input to the input module 1, performs operations in accordance with the following equation:

$$\left(\frac{W}{L}\right)_{charge,FSC} \cong 9 \left( \frac{1 + \frac{\varepsilon_{insu} d_{LC}}{t_{insu} \varepsilon_{LC}} h_{FSC}}{1 + \frac{\varepsilon_{insu} d_{LC}}{t_{insu} \varepsilon_{LC}} h_{CF}} \right) \left(\frac{W}{L}\right)_{charge,CF},$$

and generates a first operation result about capacitor charging and transfers the first operation result to the integration module 25, wherein where W is a channel width of a pixel transistor, L is a channel length of the pixel transistor, $\varepsilon_{insu}$ is a dielectric constant of an insulation layer of a field effect transistor, $t_{insu}$ is a thickness of the insulation layer of a field effect transistor, $d_{LC}$ is a thickness of a liquid crystal layer of the field effect transistor, $\varepsilon_{LC}$ is a dielectric constant of the liquid crystal layer of the field effect transistor, $h=A_{cs}/A_{pixel}$ is an area ratio between a storage capacitor and a pixel, $(W/L)_{charge,CF}$ is a width-to-length ratio between a channel width and a channel length of a field effect transistor of a color-filter display, and $(W/L)_{charge,FSC}$ is another width-to-length ratio between a channel width and a channel length of a field effect of a field-sequential color display having the same resolution and screen size as the color-filter display.

The potential holding operation module 22, after receiving the initial parameters input to the input module 1, performs operations in accordance with the following equation:

$$\left(\frac{W}{L}\right)_{hold,FSC} \cong 9 \left( \frac{1 + \frac{\varepsilon_{insu} d_{LC}}{t_{insu} \varepsilon_{LC}} h_{FSC}}{1 + \frac{\varepsilon_{insu} d_{LC}}{t_{insu} \varepsilon_{LC}} h_{CF}} \right) \left(\frac{W}{L}\right)_{hold,CF},$$

and generates a second operation result about potential holding and transfers the second operation result to the integration module 25, wherein W is a channel width of a pixel transistor, L is a channel length of the pixel transistor, $\varepsilon_{insu}$ is a dielectric constant of an insulation layer of a field effect transistor, $t_{insu}$ is a thickness of the insulation layer of the field effect transistor, $d_{LC}$ is a thickness of a liquid crystal layer, $\varepsilon_{LC}$ is a dielectric constant of the liquid crystal layer, $h=A_{cs}/A_{pixel}$ is an area ratio between a storage capacitor and a pixel, $(W/L)_{charge,CF}$ is a width-to-length ratio between a channel width and a channel length of a field effect transistor of a color-filter display, and $(W/L)_{charge,FSC}$ is another width-to-length ratio between a channel width and a channel length of a field effect of a field-sequential color display having the same resolution and screen size as the color-filter display.

The asymmetric kickback operation module 23, after receiving the initial parameters input to the input module 1, performs operations in accordance with the following equation:

$$W_{kb,FSC} \cong 3 \left( \frac{1 + \frac{\varepsilon_{insu} d_{LC}}{t_{insu} \varepsilon_{LC,min}} h_{FSC}}{1 + \frac{\varepsilon_{insu} d_{LC}}{t_{insu} \varepsilon_{LC,min}} h_{CF}} \right) \left( \frac{1 + \frac{\varepsilon_{insu} d_{LC}}{t_{insu} \varepsilon_{LC,max}} h_{FSC}}{1 + \frac{\varepsilon_{insu} d_{LC}}{t_{insu} \varepsilon_{LC,max}} h_{CF}} \right) W_{kb,CF},$$

and generates a third operation result about capacitor coupling and transfers the third operation result to the integration module 25, wherein $\varepsilon_{insu}$ is a dielectric constant of an insulation layer of a field effect transistor, $t_{insu}$ is a thickness of the insulation layer of the field effect transistor, $d_{LC}$ is a thickness of a liquid crystal layer, $\varepsilon_{LC}$ is a dielectric constant of the liquid crystal layer, $h=A_{cs}/A_{pixel}$ is an area ratio between a storage capacitor and a pixel, $W_{kb,CF}$ is a channel width of a field effect transistor of a color-filter display, and $W_{kb,FSC}$ is another channel width of a field effect transistor of a field-sequential color display having the same resolution and screen size as the color-filter display.

The signal delaying operation module 24, after receiving the initial parameters input to the input module 1, performs operations in accordance with the following equation:

$$t_{d,scan,CF} > t_{d,scan,FSC} > \frac{1}{3} t_{d,scan,CF} \text{ and } t_{d,data,FSC} \cong t_{d,data,CF},$$

and generates a fourth operation result about signal delaying and transfers the fourth operation result to the integration module 25, wherein $t_{d,scan,CF}$ is a signal delay along a scan line of a color-filter display, $t_{d,scan,FSC}$ is a signal delay along a scan line of a field-sequential display, $t_{d,data,CF}$ is a signal delay along a data line of the color-filter display, and $t_{d,data,FSC}$ is a signal delay along a data line of the field-sequential display.

The integration module 25 receives the operation type parameters and the output form parameters input to the input module 1, the first operation result from the capacitor charging operation module 21, the second operation result from the potential holding operation module 22, the third operation result from the asymmetric kickback (capacitor coupling) operation module 23, and the fourth operation result from the signal delaying operation module 24, captures needed operations in accordance with the selected operation type parameters and the selected output form parameters, and generates a correspondence relation, such as an operation window, a compare-table and an equation, and transfers the correspondence relation to the output module 3.

When the operation window is displayed as the correspondence relation of the operation results, the integration module 25 captures needed operation results in accordance with the selected operation type parameters and shows the needed operation results by drawing an operation area in a coordinate system and transfers the operation area to the output module 3, to provide a user with an easy way to obtain ideal design parameters for designing a display pixel circuit.

Figure 3:
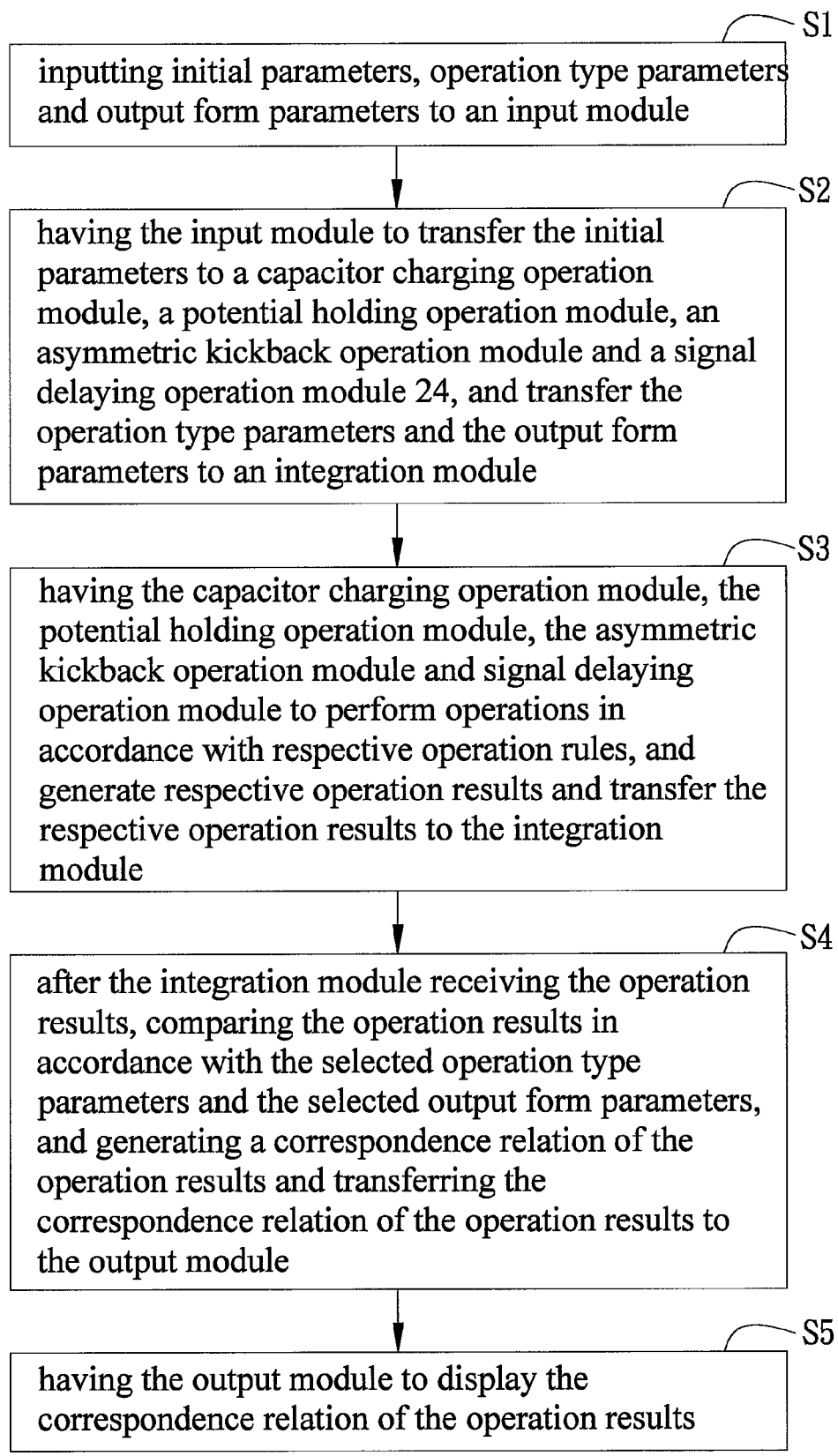
FIG. 3 is a flow chart of a display designing method of the present invention.

FIG. 3 is a flow chart of a display designing method of the present invention. The method at least comprises the following steps. In step S1, initial parameters, operation type parameters and output form parameters are input to the input module 1. Proceed to step S2.

In step S2, the input module 1 transfers the initial parameters to the capacitor charging operation module 21, the potential holding operation module 22, the asymmetric kickback operation module 23 and the signal delaying operation module 24, and transfers the operation type parameters and the output form parameters to the integration module 25. Proceed to step S3.

In step S3, the capacitor charging operation module 21, the potential holding operation module 22, the asymmetric kickback operation module 23 and signal delaying operation module 24 perform operations in accordance with respective operation rules, and generate respective operation results and transfer the respective operation results to the integration module 25. Proceed to step S4.

In step S4, the integration module 25, after receiving the operation results, generates a correspondence relation of the operation results in accordance with the selected operation type parameters, the selected output form parameters and the operation results, and transfers the correspondence relation of the operation results and the output form parameters to the output module 3. Proceed to step S5.

In step S5, the output module 3 displays the correspondence relation of the operation results and the output form parameters.

Compared with the prior art, the operation modules of the display designing system of the present invention, after the initial parameters are input and operation type parameters are selected, generate operation results and transfer the operation results to the integration module 25, which integrates the operation results and generates a correspondence relation, such as an operation window, a compare-table and an equation, and transfers the operation results and the correspondence relation to the output module 3. The output module 3 displays effect variations of a variety of designs corresponding to the initial parameters. Therefore, the method can provide a user with an easy way to obtain ideal design parameters for designing a pixel circuit.

The above-described descriptions of the detailed embodiments are only to illustrate the preferred implementation according to the present invention, and it is not to limit the scope of the present invention, Accordingly, all modifications and variations completed by those with ordinary skill in the art should fall within the scope of present invention defined by the appended claims.

What is claimed is:

1. A display designing system applied to a data processing device having an input circuit for inputting initial parameters, selecting operation type parameters and selecting output form parameters and an output circuit for displaying output results, the displaying designing system comprising:
a capacitor charging operation circuit for performing operations in accordance with a first operation rule after receiving the initial parameters input to the input circuit, to generating a first operation result about capacitor charging;
a potential holding operation circuit for performing operations in accordance with a second operation rule after receiving the initial parameters input to the input circuit, to generate a second operation result about potential holding;
a asymmetric kickback operation circuit for performing operations in accordance with a third operation rule after receiving the initial parameters input to the input circuit, to generate a third operation result about asymmetric kickback;
a signal delaying operation circuit for performing operations in accordance with a fourth operation rule after receiving the initial parameters input to the input circuit, to generate a fourth operation result about signal delaying; and
an integration circuit for receiving the first operation result from the capacitor charging operation circuit, the second operation result from the potential holding operation circuit, the third operation result from the asymmetric kickback operation circuit and the fourth operation result from the signal delaying operation circuit, and comparing the first operation result, the second operation result, the third operation result and the fourth operation result in accordance with the selected operation type parameters and the selected output form parameters, to generate a correspondence relation of the first operation result, the second operation result, the third operation result and the fourth operation result and transfer the first operation result, the second operation result, the third operation result, the fourth operation result and the correspondence relation to the output circuit;
wherein the first operation rule of the capacitor charging operation circuit comprises the following equation:

$$\left(\frac{W}{L}\right)_{charge,FSC} \cong 9 \left(\frac{1 + \frac{\varepsilon_{insu} d_{LC}}{t_{insu} \varepsilon_{LC}} h_{FSC}}{1 + \frac{\varepsilon_{insu} d_{LC}}{t_{insu} \varepsilon_{LC}} h_{CF}}\right) \left(\frac{W}{L}\right)_{charge,CF},$$

where W is a channel width of a pixel transistor, L is a channel length of the pixel transistor, $\varepsilon_{insu}$ is a dielectric constant of an insulation layer of a field effect transistor, $t_{insu}$ is a thickness of the insulation layer of a field effect transistor, $D_{LC}$ is a thickness of a liquid crystal layer of the field effect transistor, $\varepsilon_{LC}$ is a dielectric constant of the liquid crystal layer of the field effect transistor, $h=A_{cs}/A_{pixel}$ is an area ratio between a storage capacitor and a pixel, $(W/L)_{charge,CF}$ is a width-to-length ratio between a channel width and a channel length of a field effect transistor of a color-filter display, and $(W/L)_{charge,FSC}$ is another width-to-length ratio between a channel width and a channel length of a field effect of a field-sequential color display having the same resolution and screen size as the color-filter display.

2. The display designing system of claim 1, wherein the second operation rule of the potential holding operation circuit comprises the following equation:

$$\left(\frac{W}{L}\right)_{hold,FSC} \cong 9 \left(\frac{1 + \frac{\varepsilon_{insu} d_{LC}}{t_{insu} \varepsilon_{LC}} h_{FSC}}{1 + \frac{\varepsilon_{insu} d_{LC}}{t_{insu} \varepsilon_{LC}} h_{CF}}\right) \left(\frac{W}{L}\right)_{hold,CF},$$

where W is a channel width of a pixel transistor, L is a channel length of the pixel transistor, $\varepsilon_{insu}$ is a dielectric constant of an insulation layer of a field effect transistor, $t_{insu}$ is a thickness of the insulation layer of the field effect transistor, $d_{LC}$ is a thickness of a liquid crystal layer, $\varepsilon_{LC}$ is a dielectric constant of the liquid crystal layer, $h=A_{cs}/A_{pixel}$ is an area ratio between a storage capacitor and a pixel, $(W/L)_{charge,CF}$ is a width-to-length ratio between a channel width and a channel length of a field effect transistor of a color-filter display, and $(W/L)_{charge,FSC}$ is another width-to-length ratio between a channel width and a channel length of a field effect transistor of a field-sequential color display having the same resolution and screen size as the color-filter display.

3. The display designing system of claim 1, wherein the third operation rule of the asymmetric kickback operation circuit comprises the following equation:

$$W_{kb,FSC} \cong 3 \left(\frac{1 + \frac{\varepsilon_{insu} d_{LC}}{t_{insu} \varepsilon_{LC,min}} h_{FSC}}{1 + \frac{\varepsilon_{insu} d_{LC}}{t_{insu} \varepsilon_{LC,min}} h_{CF}}\right) \left(\frac{1 + \frac{\varepsilon_{insu} d_{LC}}{t_{insu} \varepsilon_{LC,max}} h_{FSC}}{1 + \frac{\varepsilon_{insu} d_{LC}}{t_{insu} \varepsilon_{LC,max}} h_{CF}}\right) W_{kb,CF},$$

where $\varepsilon_{insu}$ is a dielectric constant of an insulation layer of a field effect transistor, $t_{insu}$ is a thickness of the insulation layer of the field effect transistor, $d_{LC}$ is a thickness of a liquid crystal layer, $\varepsilon_{LC}$ is a dielectric constant of the liquid crystal layer, $h=A_{cs}/A_{pixel}$ is an area ratio between a storage capacitor and a pixel, $W_{kb,CF}$ is a channel width of a field effect transistor of a color-filter display, and $W_{kb,FSC}$ is another channel width of a field effect transistor of a field-sequential color display having the same resolution and screen size as the color-filter display.

4. The display designing system of claim 1, wherein the fourth operation rule of the signal delaying operation circuit comprises the following equation:

$$t_{d,scan,CF} > t_{d,scan,FSC} > \frac{1}{3}t_{d,scan,CF} \text{ and } t_{d,data,FSC} \cong t_{d,data,CF}$$

where $t_{d,scan,CF}$ is a signal delay along a scan line of a color-filter display, $t_{d,scan,FSC}$ is a signal delay along a scan line of a field-sequential display, $t_{d,data,CF}$ is a signal delay along a data line of the color-filter display, and $t_{d,data,FSC}$ is a signal delay along a data line of the field-sequential display.

5. The display designing system of claim 1, wherein the correspondence relation generated by the integration circuit comprises at least one selected from the group consisting of an operation window, a compare-table, and an equation.

6. The display designing system of claim 5, wherein when the operation window is displayed as the correspondence relation, the integration circuit captures needed operation results in accordance with the selected operation type parameters and shows the needed operation results by drawing an operation area in a coordinate system.

7. A computer readable medium which stores instructions, which when executed by a computer, perform a display designing method applied to a data processing device having an input circuit for inputting initial parameters, selecting operation type parameters and selecting output form parameters and an output circuit for displaying output results, the displaying designing method comprising:

inputting the initial parameters, the operation type parameters and the output form parameters to the input circuit;

having the input circuit to transfer the initial parameters to a capacitor charging operation circuit, a potential holding operation circuit, an asymmetric kickback operation circuit and a signal delaying operation circuit, and transfer the output form parameters and the operation types parameters to an integration circuit;

performing operations on the initial parameters in accordance with operation rules of the capacitor charging operation circuit, the potential holding operation circuit, the asymmetric kickback operation circuit and the signal delaying operation circuit, to generate operation results corresponding to the operation circuits, respectively, and transferring the operation results to the integration circuit;

after the integration circuit receives the operation results, comparing the operation results in accordance with the selected operation type parameters and the selected output form parameters and generating a correspondence relation of the operation results, and transferring the operation results and the correspondence relation to the output circuit; and having the output module to display the operation results and the correspondence relation;

wherein the first operation rule of the capacitor charging operation circuit comprises the following equation:

$$\left(\frac{W}{L}\right)_{charge,FSC} \cong 9\left(\frac{1+\frac{\varepsilon_{insu}d_{LC}}{t_{insu}\varepsilon_{LC}}h_{FSC}}{1+\frac{\varepsilon_{insu}d_{LC}}{t_{insu}\varepsilon_{LC}}h_{CF}}\right)\left(\frac{W}{L}\right)_{charge,CF},$$

where W is a channel width of a pixel transistor, L is a channel length of the pixel transistor, $\varepsilon_{insu}$ is a dielectric constant of an insulation layer of a field effect transistor, $t_{insu}$ is a thickness of the insulation layer of a field effect transistor, $d_{LC}$ is a thickness of a liquid crystal layer of the field effect transistor, $\varepsilon_{LC}$ is a dielectric constant of the liquid crystal layer of the field effect transistor, $h=A_{cs}/A_{pixel}$ is an area ratio between a storage capacitor and a pixel, $(W/L)_{charge,CF}$ is a width-to-length ratio between a channel width and a channel length of a field effect transistor of a color-filter display, and $(W/L)_{charge,FSC}$ is another width-to-length ratio between a channel width and a channel length of a field effect of a field-sequential color display having the same resolution and screen size as the color-filter display.

8. The computer readable medium of claim 7, wherein the second operation rule of the potential holding operation circuit comprises the following equation:

$$\left(\frac{W}{L}\right)_{hold,FSC} \cong 9\left(\frac{1+\frac{\varepsilon_{insu}d_{LC}}{t_{insu}\varepsilon_{LC}}h_{FSC}}{1+\frac{\varepsilon_{insu}d_{LC}}{t_{insu}\varepsilon_{LC}}h_{CF}}\right)\left(\frac{W}{L}\right)_{hold,CF},$$

where W is a channel width of a pixel transistor, L is a channel length of the pixel transistor, $\varepsilon_{insu}$ is a dielectric constant of an insulation layer of a field effect transistor, $t_{insu}$ is a thickness of the insulation layer of the field effect transistor, $d_{LC}$ is a thickness of a liquid crystal layer, $\varepsilon_{LC}$ is a dielectric constant of the liquid crystal layer, $h=A_{cs}/A_{pixel}$ is an area ratio between a storage capacitor and a pixel, $(W/L)_{charge,CF}$ is a width-to-length ratio between a channel width and a channel length of a field effect transistor of a color-filter display, and $(W/L)_{charge,FSC}$ is another width-to-length ratio between a channel width and a channel length of a field effect transistor of a field-sequential color display having the same resolution and screen size as the color-filter display.

9. The computer readable medium of claim 7, wherein the third operation rule of the asymmetric kickback operation circuit comprises the following equation:

$$W_{kb,FSC} \cong 3\left(\frac{1+\frac{\varepsilon_{insu}d_{LC}}{t_{insu}\varepsilon_{LC,min}}h_{FSC}}{1+\frac{\varepsilon_{insu}d_{LC}}{t_{insu}\varepsilon_{LC,min}}h_{CF}}\right)\left(\frac{1+\frac{\varepsilon_{insu}d_{LC}}{t_{insu}\varepsilon_{LC,max}}h_{FSC}}{1+\frac{\varepsilon_{insu}d_{LC}}{t_{insu}\varepsilon_{LC,max}}h_{CF}}\right)W_{kb,CF},$$

where $\varepsilon_{insu}$ is a dielectric constant of an insulation layer of a field effect transistor, $t_{insu}$ is a thickness of the insulation layer of the field effect transistor, $d_{LC}$ is a thickness of a liquid crystal layer, $\varepsilon_{LC}$ is a dielectric constant of the liquid crystal layer, $h=A_{cs}/A_{pixel}$ is an area ratio between a storage capacitor and a pixel, $W_{kb,CF}$ is a channel width of a field effect transistor of a color-filter display, and $W_{kb,FSC}$ is another channel width of a field effect transistor of a field-sequential color display having the same resolution and screen size as the color-filter display.

10. The computer readable medium of claim 7, wherein the fourth operation rule of the signal delaying operation circuit comprises the following equation:

$$t_{d,scan,CF} > t_{d,scan,FSC} > \frac{1}{3}t_{d,scan,CF} \text{ and } t_{d,data,FSC} \cong t_{d,data,CF}$$

where $t_{d,scan,CF}$ is a signal delay along a scan line of a color-filter display, $t_{d,scan,FSC}$ is a signal delay along a scan line of a field-sequential display, $t_{d,data,CF}$ is a signal delay along a data line of the color-filter display, and $t_{d,data,FSC}$ is a signal delay along a data line of the field-sequential display.

11. The computer readable medium of claim 7, wherein the correspondence relation generated by the integration circuit comprises at least one selected from the group consisting of an operation window, a compare-table, and an equation.

12. The computer readable medium of claim 11, further comprising:
having the integration circuit to capture needed operation results in accordance with the operation type parameters and show the needed operation results by drawing an operation area in a coordinate system, when the operation window is displayed as the correspondence relation.

* * * * *